United States Patent

[11] 3,624,368

[72] Inventor Keith E. Close
Phoenix, Ariz.
[21] Appl. No. 886,630
[22] Filed Dec. 19, 1969
[45] Patented Nov. 30, 1971
[73] Assignee The United States of America as represented by the Secretary of the Navy

[54] SAMPLED DATA COMPUTER
8 Claims, 4 Drawing Figs.

[52] U.S. Cl. .......... 235/150.51, 235/150.52, 235/183, 235/194
[51] Int. Cl. .......... G06j 1/00
[50] Field of Search .......... 235/150.5, 150.51, 150.52, 150.53, 194, 195, 196, 183; 328/160, 161; 307/229, 230; 340/147, 149

[56] References Cited

UNITED STATES PATENTS

| | | | |
|---|---|---|---|
| 3,443,074 | 5/1969 | Schmid | 235/150.5 X |
| 3,435,196 | 3/1969 | Schmid | 235/150.52 X |
| 3,521,038 | 7/1970 | Gilbert | 235/150.52 |
| 3,264,457 | 8/1966 | Seegmiller et al. | 235/150.51 X |
| 3,330,943 | 7/1967 | Hawkins | 235/150.5 |
| 3,465,136 | 9/1969 | Dailey et al. | 235/194 |
| 3,525,861 | 8/1970 | Alexander | 235/194 X |
| 3,536,904 | 10/1970 | Jordan, Jr. et al. | 235/194 |

*Primary Examiner*—Joseph F. Ruggiero
*Attorneys*—R. S. Sciascia and Henry Hansen

ABSTRACT: A hybrid analog computer utilizing pulse width modulation techniques wherein plural analog input signals during a sampling cycle are each sequentially applied for respective controlled portions of a sampling interval to integrator amplifiers to establish corresponding predetermined gain characteristics for the input signals. A timing control unit is connected to enable a signal multiplexer to sequentially apply each of a plurality of analog signals to the same accumulator module in order to provide over a number of such successive sampling cycles an analog signal indicative of the sum of the level or gain adjusted input analog signals. A first embodiment of a pulse width modulator includes a plurality of clock-driven counters preloaded by means of a diode matrix gain program card in order to establish a succession of sample enable signals applied to multiplexing circuitry for directing particular analog signals to particular integrators of particular accumulator modules. An adaptive gain control varies the gain imposed on a multiplier indicating analog signal magnitude with that of a ramp function from a sawtooth generator and setting the sample enable signal width upon level coincidence to enable a corresponding control gain adjustmnt of a multiplicand incidating analog signal and provide a product indicating analog output signal. A quotient pulse width modulator compares a divisor indicating signal to establish the width of a sample enable signal as a function of the quotient of the input signals which quotient pulse width modulator is used to control the integration times in a differential analyzer.

INVENTOR.
KEITH E. CLOSE

BY

ATTORNEYS

INVENTOR.
KEITH E. CLOSE

BY [signatures]
ATTORNEYS

INVENTOR.
KEITH E. CLOSE
BY
ATTORNEYS

SAMPLED DATA COMPUTER

STATEMENT OF GOVERNMENT INTEREST

The invention described herein may be manufactured and used by or for the government of the United States of America for governmental purposes without the payment of any royalties thereon or therefore.

BACKGROUND OF THE INVENTION

This invention generally relates to analog computers and, more particularly, to a hybrid analog computer wherein the analog input signals are sampled at intervals.

Desirable functions of advanced flight control systems include stability augmentation, trim control, direct lift control, attitude control, altitude control, automatic navigation, automatic terrain following and avoidance, and automatic landing. A majority of the various computations and signal processing required to mechanize the above-indicated flight control functions can be accomplished with sufficient accuracy by conventional analog methods. However, modification of particular analog computing systems during flight is not simple. Often a considerable amount of hardware design is necessary. Simple changes of gain for input signals require replacement of resistors and capacitors. Conventional analog computers have the disadvantage of being relatively inflexible and require different designs for different applications. Additionally, since flight control systems should be easy to maintain, i.e., faulty components should be easy to locate and replace, an analog computer of modular design which can be easily programmed is desirable.

SUMMARY OF THE INVENTION

The general purpose of the invention is to provide an improved, easily programmed computer suitable for performing analog computations which has improved flexibility and adaptability over known systems. It is desirable that the computer be suitable for use with flight control systems. The general purpose and other objects are accomplished by providing a sampled-data computer wherein the primary variables are represented by analog voltages and wherein digital and discrete control functions are incorporated to affect additional performance capabilities and provide a programmable computer. Additionally, the invention contemplates a computer configuration suitable for the use of a timing control with standardized replaceable accumulator modules useful for establishing computer configurations for signal addition, multiplication, division, and generation of nonlinear functions wherein faulty components are easy to locate and replace and wherein the number of categories of replacement parts is minimized. More particularly, the invention contemplates the provision of a sampled data computer wherein the analog input signals are sequentially sampled and applied for controlled durations to integrators in order to effect a gain adjustment of the appropriate scaling or amplification factor desired so that no replacement of components is required to change the desired gains. The invention further contemplates the provision of a sampled data computer which may be configured to perform nonlinear computations and which obviates or mitigates requirements for special purpose function generators.

DESCRIPTION OF THE PREFERRED EMBODIMENTS

General Description

Figures 1, 3:
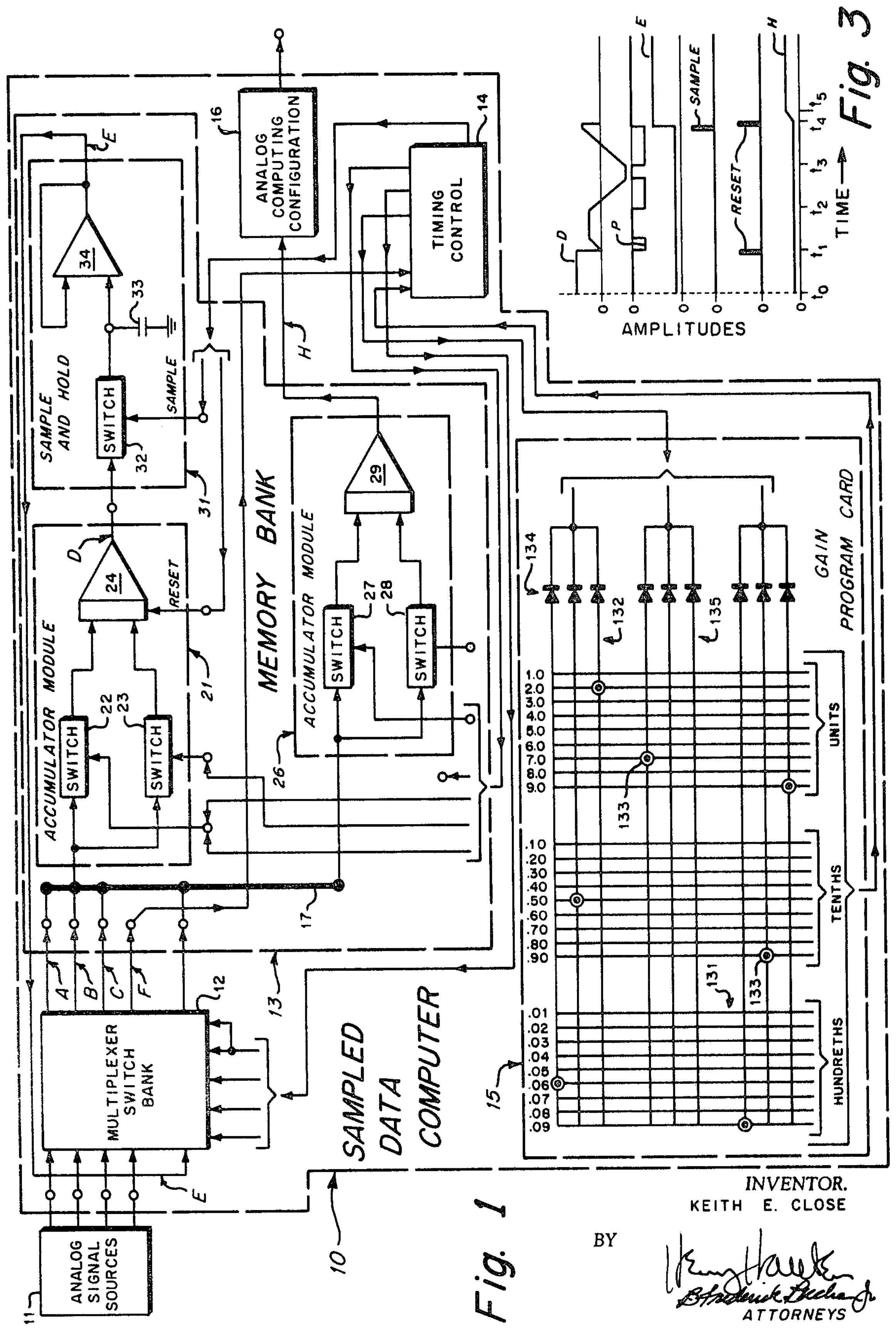
FIG. 1 represents a partial block and schematic diagram of a sampled data computer according to the invention.
FIG. 3 represents an example of signal amplitude-timing diagrams for some signals present in the computer configuration of FIG. 1.

The sample data computer 10 of FIG. 1 receives a plurality of analog signals from analog signal sources 11 which may include sensors and conventional DC voltage supplies for providing constants. More particularly, the input analog signals are each applied through a respective controllable solid-state, analog signal switch in a multiplex switch bank 12 to a memory bank 13 under the control of a timing control 14 more particularly described in FIG. 2. A gain program card 15 of a diode matrix type is provided to enable programming predetermined gain levels for levels for particular ones of the input analog signals being applied by the switch bank 12 to the memory bank 13. In the memory bank the analog input signals are applied by sequential multiplexing to accumulator modules having integrators each for predetermined periods of time in accordance with the particular gain factor to be assigned to each particular input signal. The output signals of the integrators may be sampled and held and thereafter utilized by various interconnections of elements in the memory bank through the multiplexer switch bank 12 to provide analog signals applied for utilization such as further analog computing configurations 16 or such as conventional circuit means for generating control signals applied to actuator elements for aircraft control surfaces when the sample data computer is being used in a flight control system.

A standard analog integrator comprising an input resistor of resistance $R$, a high gain amplifier and a feedback capacitor of capacitance $C$ provides an output signal:

$$e_0=\frac{-1}{RC}\int e_i dt$$

The sampled data computer 10 of the invention contemplated the application of the signal $e_i$ through a switch rendered conductive for a sample time $\tau$ seconds and operated at a rate of $1T$ or $N$ samples/second where $N >$ twice the maximum frequency of $e_i$. Since the average level of the sampled input voltage is:

$$e_i^{*(avg)}=e_i\frac{\tau}{T}=e_i N\tau$$

the sampled data integrator provides $$e_o=\frac{-N\tau}{RC}\int e_i dt$$

wherein the overall integrator gain is $$G=\frac{N\tau}{RC}$$

Accordingly, $\tau$ may be digitally or otherwise manipulated to change gain while $R$ and $C$ remain constant.

THE MEMORY BANK

More particularly, the memory bank 13 includes a plurality of accumulator modules such as a resettable accumulator module 21 which are connected via an information bus 17 to receive one or more of the analog input signals in succession from the multiplexer switch bank 12 as directed by the timing control 14. The accumulator modules 21 each includes a pair of controllable, solid-state analog signal switches 22 and 23 which are each operated to disconnect the respective one of the noninverting and the inverting input terminals of a difference signal integrator amplifier 24 from ground and apply thereto the analog signal being fed to the bus 17 in accordance with the particular polarity of the particular gain to be assigned to the input signal being received. The switches 22 and 23 are operated in the alternative by the timing control 14 synchronously with the operation of the particular switch in the bank 12 through which the analog input signal is being applied to he bus 17. The analog integrator 24 shown in FIG. 1 is of the resettable type for use in instances where the output signal level is to be set to zero prior to successively sampling a plurality of analog input signals. The accumulator module 26 is connected to receive analog signals from the bank 12 via the bus 17 and is similar to the accumulator module 21, having a pair of polarity control switches 27 and 28 for applying the signal to respective ones of the noninverting and inverting inputs of an integrator amplifier 29 which is not of the resettable type.

It is preferred that the module switches such as 22, 23, 27 and 28 of the banks 12 and 13 be of the solid-state type which can when operated pass an analog signal of positive or negative levels in response to a sample control signal and otherwise apply a ground potential to the integrator input terminal. A suitable switch can be built using two channels of a four channel driver designated DG118L (Siliconix, Inc.) wherein a digital control signal operates one channel to connect the integrator input terminal with the bus 17 and the inversion of the control signal operates the other channel to ground that input terminal. A suitable integrator amplifier may be built with a $\mu$A709 operational amplifier driven by a $\mu$A727 thermally stabilized differential preamplifier which combination provides an open loop gain in excess of two million and has a very low drift performance. Equally valued input resistors R, a feedback capacitor E connected to the minus or inverting amplifier input, and an equally valued grounded capacitor C connected to the other input are conventionally used to form a difference integrator with a gain equal to $1/RC$. Bipolar transistor switches responsive to a reset signal are connected to short out the capacitors C when operated in order to initialize the integrator amplifier output at zero voltage level.

If a plurality of analog signals are sequentially applied to the accumulator module 21, the integrator amplifier 24 will provide an output signal having a voltage level which is equivalent to the sum of each of the analog signals applied thereto as adjusted to a predetermined gain by the relative duration of the signal sampling time. The reset control signal from the timing control 14 establishes the accumulator module 21 output signal at a zero voltage level at the beginning of a summing period so that previously applied signals are not entered.

Since the integrator amplifier output signal can be full scale in a single time slot, a plurality of sample hold modules such as 31 are also provided in the memory bank 13 in order to store the output signal of the accumulator module 21 resulting from a particular series of signal additions. More particularly, the sample and hold circuit 31 receives the output signal of the integrator amplifier 24 and includes a solid-state switch 32 for passing analog signals of either polarity in response to receipt of a digital control sample signal from timing control 14. The switch 32 is connected to apply the received analog signal across a nonpolarized capacitor 33 to the plus input terminal of an operation amplifier whose output signal is fed back to the minus input terminal thereof. The output signal of the sample and hold circuit 31 may, for example, be directly applied to further analog computing configurations 16 or for processing circuits or may, as shown in FIG. 1 be applied through the multiplexer switch bank 12 to the information bus 17 for multiplexing to another accumulator module 26 for further gain adjustment and applied to other analog computing configurations 16.

THE TIMING CONTROL

Figure 2:
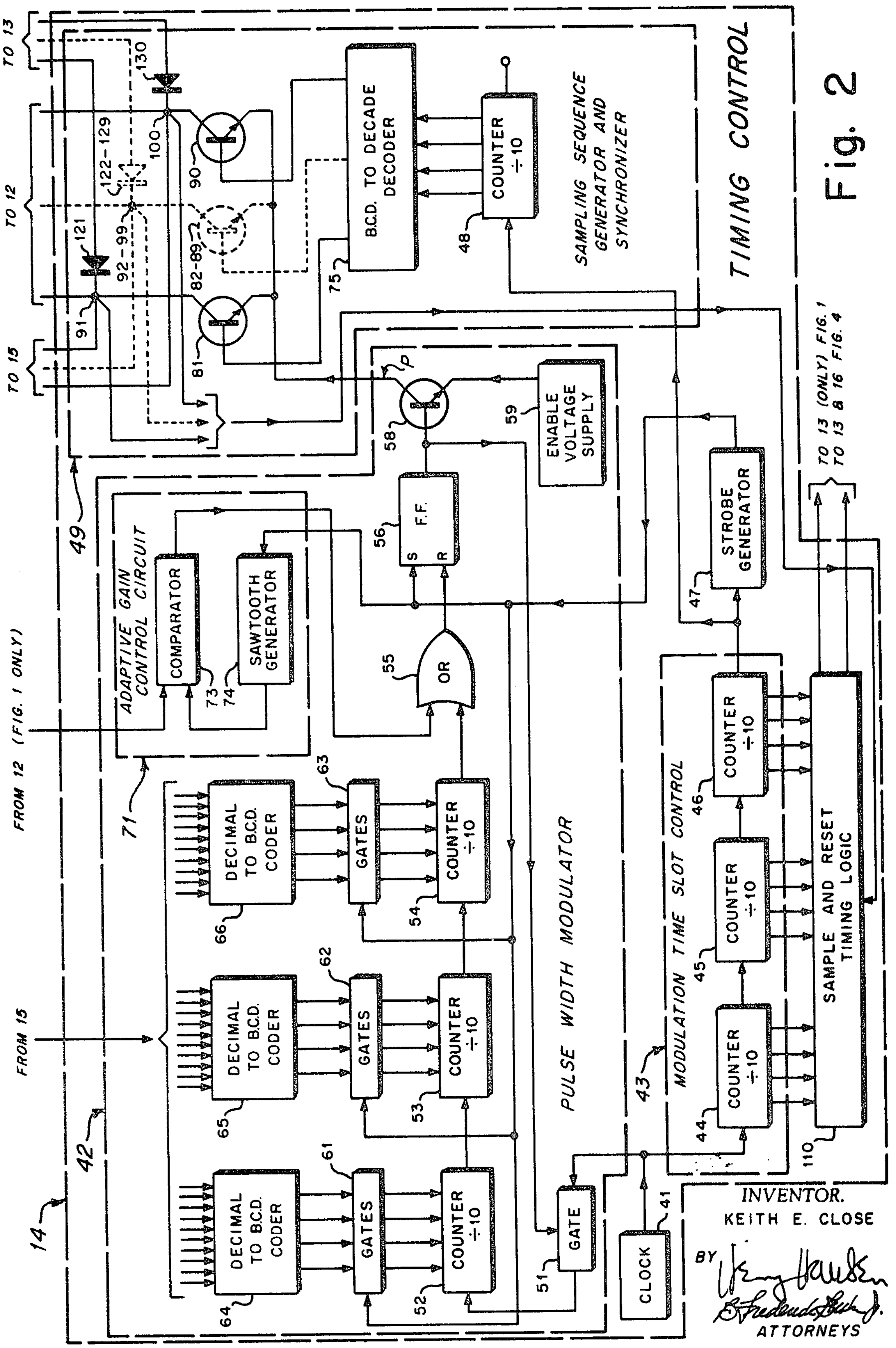
FIG. 2 represents a partial block and schematic diagram of a timing control for the computer of FIG. 1.

The merit of signal gain adjustment by establishing a controlled sampling interval for each input signal may be better understood by referring to FIG. 2 which discloses the timing control 14 in more detail. The timing control 14 includes a clock 41 which provides a series of clock pulses of suitable repetition frequency and duration for operation counter flip-flops.

A clock frequency of 1 mHz. permits the establishment of sampling intervals of 1 millisecond with a range of about 1,000 possible levels of gain control, i.e., about 0.1 percent accuracy. The number of successive channels would slot be limited by the desired sample rate *N*. The clock output pulses are applied both to a pulse width modulator 42 which established a particular signal sampling interval duration and to a modulation time slot control 43 which establishes the maximum sampling interval duration. The time slot control 43 comprises a plurality of serially connected or cascaded binary counters 44, 45 and 46 each providing one output pulse for each ten input pulses applied thereto. The output pulse from the most significant counter 46 is applied to a strobe generator 47 which generates a strobing pulse to synchronize the flow of information in the pulse width modulator 42 and is applied to a divide by 10 binary counter 48 in a sampling sequence generator and synchronizer 49 which functions to sequentially drive the switches to the multiplex switch bank 12, selected switches such as 21 in the memory bank 13 and also signal applying switches in the analog computing configurations 16 when required (see FIG. 4). The strobe generator 47 therefore provides strobe pulses at a repetition frequency of 1 kHz. as driven by the series of output pulses from the modulation time slot control unit 43.

THE PULSE WIDTH MODULATOR

Basically, the pulse width modulator 42 operates to provide a sample enable output signal P to the sampling sequence generator and synchronizer 49 only during that portion of time corresponding to the desired gain to be assigned to the analog input signals being applied to the accumulator modules such as 21 in the memory bank 13. More particularly, the clock pulses from the clock 41 are applied through a gate 51 to three serially connected or cascaded binary counters 52, 53 and 54, each of which provides one output pulse for every 10 input pulses received. The output pulse from counter 54 is applied through an OR-gate 55 to reset a flip-flop 56. The flip-flop 56 is connected to be set by the output of strobe generator 47. The set output signal of the flip-flop 56 is applied to the base of an NPN switching transistor 58 whose emitter is connected to a switch enable voltage supply 59 in order to cause the transistor 58 to conduct, providing the sample enable signal P. The set output signal of the flip-flop 56 is also applied to enable the gate 51 to transmit clock pulses to the counter 52. Accordingly, when the counter 54 has recycled from full count, it resets the flip-flop 56 to cause the sample enable signal P to return to zero level or terminate. The gate 51 is inhibited, and the clock 41 is disconnected from the counter 52. The counters 52, 53 and 54 are preloaded at the beginning of each sampling interval as desired by a strobe pulse from generator 47 which is applied to a plurality of buffering gates 61, 62 and 63 interposed between the output terminals of three decimal to binary-coded decimal (BCD) coders 64, 65 and 66 and the four stages of the corresponding binary counters 52, 53 and 54. The coders 64, 65 and 66, in turn, provide a binary signal in one's complement form as controlled by the gain program card 15, hereinafter more fully explained.

It is preferred that the two least significant digit counters 52 and 53 be internally programmed to recycle from the binary count of 1111 to contain the binary count 0110. Accordingly, the count range from these counters 52 and 53 is established from six to 16, i.e., binary 0110 to binary 1111 in order to fit the one's complement data input from the coders 64 and 65 with a minimum gate count. Inverted data entry into the direct clear input of the middle two bits or stages of the counters 52 and 53 corrects for the recycling of those stages to contain 0110. The counter 54 may be a standard four bit ripple counter since the most significant digit counter cycles only once per sampling interval while the others cycle maximums of 100 times and 10 times respectively.

An alternative method of varying the duration of the sample enable signal is a sampling interval for a particular input signal is effected by an adaptive gain control circuit 71 including a sawtooth generator 72 which is enabled by the strobe generator 47 to produce a ramp function, in turn, applied to a voltage comparator 73. The comparator 73 is connected to one of the switches in the multiplexer switch bank 12 for receiving a particular analog signal such as X whose level is to establish the gain for the particular analog input signal such as Y which is simultaneously being applied by the bank 12 to the accumulator module such as 26. This configuration enables the module 26 to provide an output signal representing the product of a pair of analog signals X and Y.

THE SAMPLING SEQUENCE GENERATOR AND SYNCHRONIZER

The counter 48 in the sequence generator and synchronizer 49 is a conventional divide by 10 binary counter whose four bits or stages are connected to provide output signals to a conventional binary-coded decimal to decade decoder 75. Accordingly, as the counter 48 sequences from 1 through 10in binary numbers, the decoder 75 successively provides on each of a succession of 10 output lines an output signal applied to the base of a respective NPN transistor 81, and 82 to 90 whose emitters are connected together and to the collector of the transistor 58 in the pulse width modulator for receiving the sample enable signal P. The 11th pulse recycles the counter 48 to indicate one. The collectors of the transistors 81 to 90 are each connected to junctions 91–100 which junctions, in turn are connected to the gain program card 15, to respective ones of the switches in the multiplexer switch bank 12 and also to a sample pulse and reset pulse timing logic unit 110, hereinafter more fully described. The junctions 91–100 are also connected via diodes 121–130 to appropriate ones of the accumulator module switches such as 22, 23, 27 and 28 in the memory bank 13. It should be apparent that as a particular junction such as 91 is energized by the sample enable signal P, the particular analog signal being applied to that switch of the bank 12 being operated is applied via the bus 17 to that accumulator module such as 21 having one of its polarity switches such as 22 in operation by reason of the enable signal being applied through that diode 121 connected to that junction 91. Also, the transistors 81–90 may comprise the output stages of the BCD to decade decoder 75.

THE GAIN PROGRAM CARD

Referring again to FIG. 1, the gain program card 15 is of a conventional programmable diode matrix patchboard configuration and has three groups of nine parallel busbars such as the least significant digit indicating group 131, each group being connected to provide an input signal to a respective one of the decimal to BCD coders 64–66 in the pulse width modulator 42 of the timing control 14. The gain program card 15 further includes a plurality of groups of three orthogonally extending busbars such as 132 each connected through a diode such as 134 to a particular one of the junctions 91–100 in the sequence generator and synchronizer 49. In order to establish a predetermined gain each of the three orthogonal conduction bars such as 132 is electrically connected as by a pin 135 or a switch to an appropriate one of the groups 131 of nine conduction bars in accordance with the particular decimal to be selected, no connection being necessary for the decimal 0. For example, to establish a gain of 2.56 the orthogonal bars in the group 132 are connected with respective ones of the busbars designated "2," "0.5" and "0.06" as shown. Accordingly, the coders 64, 65 and 66 respond to provide a binary output signal which is the one's complement of the particular binary number representing the selected decimal. For example, the coders 64, 65 and 66 respectively apply binary counts (most significant bit first) of 1001, 1010 and 1101 to the counters 52, 53 and 54. When the 256th pulse from the clock 41 has passed through the gate 51 to drive the counters 52, 53 and 54, all the counters will have a full count being 1111 1111 1111. The next clock pulse that comes through the gate 51 recycles all the counters to contain counts of 0110 0110 0000 so that the counter 54 applies an output signal through the exclusive OR-gate 55 to reset the flip-flop 56 causing the gate 51 to be inhibited. Accordingly, the counters are ready for loading the next gain for the next analog signal to be sampled as established by the next group 135 of three orthogonal bus connected in turn to that one of the junctions 91–100 next energized by conduction of the next one of the transistors 81–100 to be activated by counter 75. Of course, if none of the nine decimal indicating bus in a particular group is connected via an orthogonal bus to a junction in the sequence generator and synchronizer 49, the associated one of the coders 64, 65 or 66 provides a 1111 signal to its respective counter 52, 53 or 54.

SAMPLE AND RESET TIMING LOGIC

It is the function of the logic 110 to provide sample pulses and reset pulses at appropriate times during selected sampling intervals. For example, it is desirable that a sample pulse of sufficient duration be produced as close to the end of the particular modulation time slot as is feasible. A pulse 20 microseconds in duration occuring 30 microseconds prior to the end of a particular sample interval or time slot is suitable for the capacitor 32 in the sample and hold circuit 31 in the memory bank 13 to charge up to the voltage present at the output of the appropriate module 21 to which the sample and hold circuit 31 is connected. The reset pulses applied to the integrator amplifiers such as 24 in the module 21 are produced to occur a sufficient delay as about 2 microseconds after the end of the sample pulse to allow the sample and hold switches 32 to stabilize and have a sufficient duration such as about 6 microsecond to effect capacitor discharge enabling the integrator amplifier 24 to provide an output voltage of zero level at the beginning of the next sampling interval or modulation time slot. Thus, the timing logic 101 can be conventionally implemented by one skilled in the art to provide the sample pulses and reset pulses at the predetermined designed times. For example, the appropriate one of the junctions 91–100 is applied to conventional logic gating along with the appropriate combination of output signals from the binary bits of the counters 44, 45 and 46.

SIGNAL SUMMING EXAMPLE

In order to illustrate the operation of the pulse width modulator 42 in the context of a problem wherein the accumulator module 21 will provide an output signal D equivalent to the sum of the integrals of three inputs signals $A$, $B$ and $C$ each of whose gains $G_A$, $G_B$ and $G_C$ are to be successively adjusted to predetermined degrees:

$$D=2.56A-7.00B=9.99C$$

The gain program card 15 is programmed to establish the gains of the respective signals $A$, $B$ and $C$. For example, the group of orthogonal conductors 132 which are electrically connected to the junction 91 (FIG. 2) as is electrically connected with the particular switch in the bank 12 providing signal $A$ is connected to a respective one of the transverse decimal indicating bars by conventional means such as a pin or a switch (not shown). The junction 91 is also connected via diode 121 to the switch 22 for applying $A$ to the noninverting input of integrator amplifier 24 which has an integration gain of 10 over one sampling interval or time slot of 1 millisecond. The timing logic 110 is implemented to provide a reset pulse at or before time $t_1$ to the integrator amplifier 24 causing the output level of waveform D to be reset to zero at time $t_1$, at the beginning of the first sampling interval as shown in FIG. 3. Thereupon, the strobe generator 47 strobes the gates 61, 63 and 63 and triggers the monostable flip-flop 57 so that the flip-flop 56 is in a set condition. The transistor switch 58 thereupon generates the sample enable signal P by applying the voltage supply 59 through the transistor 81 (rendered conductive by the BCD to decade decoder 75 in response to the output signal of counter 48) to junction 91 and the gain program card 15 to the coders 64, 65 and 66, enabling the input of the 1's complement of the binary form of the three digit decimal to be loaded into the counters 52, 53 and 54. Accordingly, counter 52 is preloaded with (most significant negative digit first) 1001, counter 53 with 1010, and counter 54 with 1101. The clock pulses from clock 41 are then counted by the counters 52, 53 and 54 until each of the four bits of each of the counters contains a logical 1. The next clock pulse, i.e., the 257th entering through gate 51 causes the counter 10 to recycle to 0000 and apply an output pulse through the OR-gate 55 to reset the flip-flop 56. Thereupon, the transistor 58 is cut off to disconnect the voltage supply 59 from enabling the switch in the switch bank 12 and the polarity switch 22 in the module 21 which were applying signal A to the integrator amplifier 24. The gate 51 is also inhibited by the absence of the set output signal from the flip-flop 56 so that no more clock pulses are counted. Accordingly, the resulting level 2.56*A* of the output signal of the integrating amplifier 24 which has been integrating signal *A* at a constant rate which depends upon the duration of the time (0.256 m.sec.) that the pulse width modulator 24 caused the transistor switch 58 to simultaneously operate the switches in the switch bank 12 and memory bank 13.

At the end of the first sampling interval signaled by the control 43, the strobe generator 47 causes the flip-flop 56 to the set at time $t_2$ enabling the transistor 58 to connect the voltage supply 58 with the switch in the bank 12 which receive the analog signal B. The control 43 has coincidentally provided an output signal to advance the counter 48 in the sequence generator and synchronizer 49 by one count coincidentally with the application of the output signal from counter 54 to set the flip-flop 56 so that the transistor 81 is rendered nonconductive and the transistor 82 is rendered conducive by the decoder 75. Accordingly, the junction 92 which is connected with the second group of three orthogonal conductors in the program card 15 and via the diode 122 to the negative polarity switch 23 applying the signal B to the inverting input of integrator amplifier 24 is energized to cause a signal to be applied to the conductor 7 of the units indicating bus in the gain program card 15 applied to the coder 66. In the absence of application of a programming input signal to the coders 64 and 65, respective counts of 1111 and 111 are applied to the bits of the counters 52 and 53 through the gates 61 and 62 which are strobed by the generator 47. Accordingly, counters 52 and 53 are preloaded with the counts 1111 and counter 54 is preloaded with the count 1000 (most significant digit first). The modulator 42 proceeds as above to render the transistor 58 conductive until such time as all bits of the counters 52, 53 and 54 contain a logical 1. The next clock pulse (701st) that passes through the gate 51 recycles the counters 52, 53 and 54.

The gain program card 15 is similarly programmed so that each of the three orthogonal bus in the third group is connected respectively with the 9's indicating bus. As shown in FIG. 3, the signal D drops past zero to a level 2.56A−7.00*B*. As the control 43 provides an output signal to further advance the counter 48 by a count of one the next one of the transistors 81 to 90 is enabled so that the junction connected to the switch in the bank 12 for applying the signal C to the module switch 22, since the gain $G_C$ is positive. Switch 22 is also simultaneously operated for applying the signal C to the integrating amplifier 24 for the time period controlled by the modulator 42. As set by connection of the third group orthogonal bus to the program card output bus, 999 clock pulses are required to fill the counters 52, 53 and 54, causing flip-flop 56 to be reset. The modulator 43 in this case provides a maximum gain to the signal being applied to the accumulator module 21 as shown in FIG. 3. A sample pulse is generated by the logic 110 in response to energization of the third one of the junctions 91–100 and also to the counters 44, 45 and 46 achieving full counts. Accordingly, the switch 32 in the sample and hold circuit 31 is enabled at the end of the third sampling interval just prior to time $t_4$ so that the signal D is applied across the capacitor 33. The amplifier 34 quickly provides just prior to time $t_4$ an output signal E whose level is equal to that of signal D as shown in FIG. 3. Thereafter the integrator amplifier 24 is reset to zero.

EXAMPLE OF SIGNAL MULTIPLICATION

The signal E may be gain adjusted in accordance with the level of an analog signal F during a sampling interval. As shown in FIG. 1, the signal E is applied through a switch in the bank 12 to the accumulator module 26 which is not of the resettable type and which is providing an output signal H indicative of the product of E and F, i.e., $[G_AA+G_BB+G_CC]F$, during the previous sampling cycle to an appropriate analog computing configuration 16 for the particular equation to be solved by the computer 10. Simultaneously with the operation of a switch in bank 12 for applying the signal E to the accumulator module 26 upon energization of one of the junctions 91–100, another switch in the switch bank 12 is operated to apply signal F to the comparator 73 of the adapter gain control circuit 71 in the pulse width modulator 42 of the timing control 14 (FIG. 2). At time $t_4$, the monostable flip-flop 57 in response to the strobe generator 47 activates the sawtooth generator 72 to provide its ramp function having a duration equivalent to the sampling interval. The amplitude variation of the output signal of the sawtooth generator 72 encompasses the anticipated range of variation for the signal F. Accordingly, when the level of the ramp function from the sawtooth generator 72 equals the level of the signal F applied to the comparators 73 the comparator provides an output signal which is applied through the OR-gate 55 to reset the flip-flop 56. At that time $t_5$ the voltage supply 59 is disconnected from the switch 27 which is applying the signal E to the integrator amplifier 29 accumulator module 26. The change in the level of H represents the change in the product E·F since the preceding sampling cycle. Of course, a module such as 21 and a sample hold circuit 30 could be used in place of the accumulator module 26.

In order to keep the digital counters 52, 53 and 54 from prematurely resetting the flip-flop 56, the gain control program card 15 is programmed with the maximum programmable gain, e.g., 9.99. Accordingly, as long as F is within the anticipated range, the output from the comparator 71 which resets the flip-flop 56 must occur before the output signal from the counter 54. Alternatively, another flip-flop could be connected to receive the output pulse from counter 54 which flip-flop would be set by the monostable flip-flop 57 and provide the set output signal for enabling the gate 51. Also, conventional logic circuitry could be provided to disable the flip-flop 56 in the event that an analog signal is to be applied during a particular sampling interval to the comparator 73 via the switch bank 12.

QUOTIENT PULSE WIDTH MODULATOR

From the above examples it is apparent that the sampled data computer configuration of FIG. 1 can effect forms of nonlinear computation. However, the adaptive gain control 71 in the pulse width modulator 42 requires a unipolar signal input. Accordingly, only two quadrant multiplication can be performed therewith. The computer configuration of FIG. 4 discloses the use of a quotient pulse width modulator 150 which provides for full four quadrant multiplication and division capability.

More particularly, the quotient pulse width modulator 150, which may be considered to be part of the timing control 14, is connected to receive a pair of analog output signals W and X representing the divisor and the dividend and provides as an output signal a pulse Q whose duration is proportional to the quotient X/W of the input signals W and X. The quotient pulse width modulator 150 includes at its input stage a pair of solid-state, analog signal switches 151 and 153 each connected to receive a respective one of the analog input signals W and X from accumulator modules 153 and 154 in the memory bank 12. The accumulator modules 153 and 154 may be operated by the timing control 14 in conjunction with the gain program card 15 to impose predetermined amounts of gain on the analog signals X and W.

For example, the analog signal source may include a voltage supply V which is used to supply a voltage V for generating constants to be used by the analog computer during computation. The voltage V would be selected so that when gain adjusted by the accumulator module 153 in the manner disclosed above it provides the voltage W of the desired level to the switch 151. Accumulator modules 153 and 154 as shown are like module 26 but may be of the resettable type like module 21. Sampling and hold circuits like 31 may be utilized particularly where it is desired to sequence other analog input signals to the quotient pulse width modulator 150 during the sampling cycle where all input data is sampled.

The quotient pulse width modulator 150 further includes a resettable accumulator module 155, an analog signal level comparator 156 of conventional design and sign logic 157 whose function is to apply the output signal from the quotient pulse width modulator 150 to the appropriate one of two polarity indicating output lines 158 and 159. More particularly, the sign logic 157 includes a pair of zero crossing detectors 161 and 162 each connected to receive a respective one of the analog signals W and X via the switches 151 and 152. The detectors 161 and 162 provide output signals of the logic ONE level in the event that the particular analog signal being applied thereto is positive which detector output signals are applied to an exclusive OR-gate 163. The output signal from the exclusive OR gate is applied to set a flip-flop 164 in the event that the polarities of X and of W are different and is applied through an inverter 165 of conventional design to set a second flip-flop 166 in the event that the analog signals X and W have the same polarity. The comparator 156 is connected to receive the dividend signal X from the switch 152 and the output signal from the module 155 and provides an output pulse applied to reset the flip-flops 164 and 166 when the output from the accumulator module 155 equals the level of the dividend indicating analog signal X, thereby terminating the sample enable signal. The output signals from the flip-flops 166 and 164 are also applied respectively to the positive polarity and negative polarity switches in the accumulator module 155. When the analog signals X and W have the same polarity an output signal =Q appears on output line 158 for a duration equivalent to the positive +X/W and terminated by resetting the flip-flop 166 when the divisor signal W applied to the accumulator module 155 has been integrated for a sufficient length of time at a constant rate to achieve a level, i.e., W times X/W equal to that of the dividend analog input signal X. Similarly, where the signals X and W have opposite signs the signal –Q of duration equivalent to the quotient X/W appears on output line 159 indicating a negative quotient.

Since the comparator 156 does not reset the flip-flops 164 and 166 until the gain adjusted analog signal from the accumulator module 155 equals the dividend signal X being applied thereto through the switch 152, the comparator 156 controls the gain factor X/W imposed on the divisor signal W applied to the module 155 just as the pulse width modulator 42 controls the gain factor imposed on the input signals to the accumulator modules 21 and 26 of FIG. 1. At or prior to the beginning of a sampling interval the accumulator module 155 is reset to zero. It is apparent that if the polarities of signals X and W are different it will be necessary to apply signal W to the inverting input of the integrator amplifier of the module 155. Accordingly, the output signal from flip-flop 164 is applied to enable the minus polarity switch which applies the signal W to the integrator amplifier of module 155. When the polarities of X and W are the same, the output signal from flip-flop 166 is applied to enable the positive polarity switch which applies W to the noninverting input of the integrator amplifier thereof. It may be necessary to adjust the scaling factor of the integrator amplifier in the module 155 to assure that the output signal of the module 155 which generally increases in magnitude at a constant rate sufficient to at least equal the magnitude of the maximum anticipated value signal X within one sampling interval or modulation time slot. Accordingly, the sample enable output signals +Q and –Q appearing on the lines 158 and 159 can be used to generate from a constant input signal in an accumulator module of the type described the quotient X/W. These sample enable signals may be utilized to adjust the gain of other analog signals as shown above. If the signal W is set to equal the quantity one, the output signal of an accumulator module controlled by these signals represents the product of X and the module input signal.

ANALOG COMPUTING CONFIRUATION—DIFFERENTIAL ANALYZER

Figure 4:
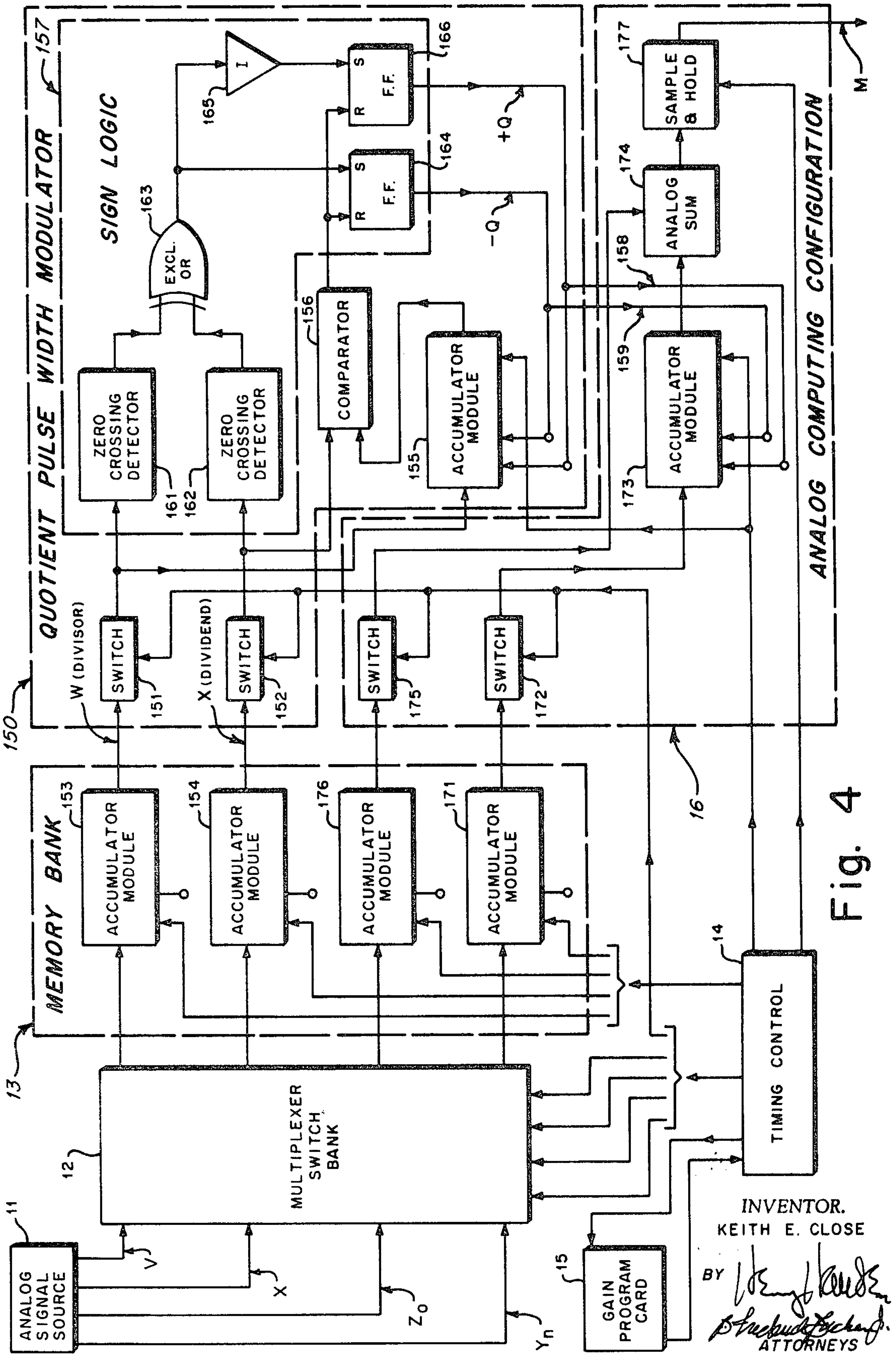
FIG. 4 represents a block diagram of an analog differential analyzer configuration for the computer of FIG. 1.

The accumulator modules disclosed are quite useful in various analog computing configurations. FIG. 4 discloses a configuration for solving the equation:

$\text{output} = Z_o + \int_0^{X/W} Y_n(X')\, dX'$ For example, the analog signal $Y_n$ which is a function of $X'$ is applied through the switch bank 12 to an accumulator module 171 whose gain adjusted output signal $G_v Y_n$, in turn, as controlled by card 15 is applied through a solid state, bipolar analog signal switch 172 controlled by the timing control 14 to a second accumulator module 173 of the resettable type like accumulator module 21 of FIG. 1. The signals appearing on the leads 158 and 159 are applied to operate the selected one of the polarity switches applying $G_v Y_n$ to the integrator amplifier in the module 173 in the same manner as described above for module 155. The timing control 14 is programmed to provide a reset pulse to the module 173 at or prior to the beginning of the sampling period. The output of the module 173 represents the product of the average value of $G_v Y_n$ during the sampling interval and the quotient $X/W$ which signal is applied to an analog-summing device 174, in turn, connected to receive an initial condition indicating signal $Z_o$ via a switch 175 from an accumulator module 176 in memory bank 13. The module 176 is connected to receive the analog signal $Z_o$ from the multiplexer switch bank 12. The signal $Z_o$ if desired may be gain adjusted to the appropriate value by the module 176 in the manner disclosed above. The output signal of the analog sum device 174 is applied to a sample and hold circuit 177 similar to circuit 31 shown in FIG. 1. A sample pulse from the timing control 14 at the end of the sampling interval causes circuit 177 to provide an output signal M equivalent to the sum of the initial condition value and the output of the accumulator module 173 and which over repeated cycles represents the solution for the differential equation.

In operation the multiplexer switch bank 12 sequences the signals $V$, $X$, $Z_o$ and $Y_n$ into the accumulator modules 153, 154, 176 and 171 in the bank 13 as controlled by the sampling sequence junction of the group 91–100 which is connnected to the collector os the fifth one of the transistors 81–90 to be rendered conductive the BCD to decade decoder 75 is electrically connected to enable all of the switches 151, 152, 172 and 175 simultaneously so that the output signals of the accumulator modules 153 and 154 are applied to the quotient pulse width modulator 150 for providing on one of the output lines 158 or 159 the sampling interval control signal applied to the accumulator module 173 which receives the signal $Y_n$.

OTHER COMPUTING CONFIGURATIONS

It is contemplated, of course, that other configurations than the one shown might be used for generating different sorts of nonlinear functions. For example, if the output signal of the accumulator module 173 is applied to accumulator module 171 as the analog signal $Y_n$, the analyzer will solve the differential equation of an exponential function wherein the output signal of the sample and hold device 177 is $Z(X)=Z_{o\,(n)}\, e$ . An angle resolver may be constructed by cross-coupling the inputs and outputs of the two accumulator modules like 173 such that one output samples the quantity $Z_a=Z_{o\,(n)} \sin X/W$ and the other samples $Z_b=Z_{o\,(n)} \cos X/W$.

It is apparent, therefore, that from the above computations such as multiplication, division, and angle resolving can be performed with the sampled data computer using the same circuit modules which are indicated above to be suitable for sampled data addition. Accordingly, the sampled data computer of the invention is well suited for use in flight control systems such as in a terrain following computer which can be programmed to cause the aircraft maneuvers to avoid obstacles.

The invention therefore provides a very flexible computer which can be programmed without the need for changing resistors and capacitors. The invention provides a sampled data computer which can be time shared with other computer functions of the digital control of the timing control 14 since the sample rate is sufficiently great compared to the anticipated rate of variation of the analog signals being applied thereto. The sampled data computer easily affects adjustments in the gains of analog signals applied thereto. Further, the computer includes modules which can be configured to affect not only sample data addition but also multiplication, division, and generation of other nonlinear functions such as exponentials.

Obviously many modification and variations of the present invention are possible in light of the above teaching. It is therefore to be understood that within the scope of the appended claims the invention may be practiced otherwise than as specifically described.

What is claimed is:

1. Apparatus comprising:

timing control means for providing a succession of sample enable signals of controlled durations during predetermined sampling intervals including a clock for providing clock pulses, modulation time slot control means responsive to a predetermined number of pulses from said clock for providing an output signal, and sampling sequence generator and synchronizing means responsive to said slot control means output signal for providing said sample enable signals and pulse width modulator means responsive to gain signals for determining the respective ends of said sample enable signals;

diode matrix means receiving said sample enable signals for providing said gain signals at selected ones of a plurality of outputs to said pulse width modulator means;

at least one integrator means for changing at a constant rate the magnitude of an analog signal applied thereto; and switch means including multiplexing means for successively applying a plurality of analog signals at respective outputs to said integrator means for said controlled durations in response to successive sample enable signals from said timing control means.

2. Apparatus according to claim 1 further comprising:

said pulse width modulator means for further including counter means receiving said clock pulses for providing an output signal, the output flip-flop means connected to be reset by said counter means output signal, strobe generator means having an output signal connected for setting said flip-flop means in response to said slot control output signal, and transistor switch means having a control electrode connected to receive the set output signals of said flip-flop means for providing said sample enable signal; and said sampling sequence generator and synchronizing means including a plurality of transistor switches successively enabled in response to said slot control means output signal and connected for providing said sample enable signal to said switch means.

3. Apparatus according to claim 2 further comprising:

said counter means including a plurality of binary counters; and gating means responsive to said strobe generator means output for applying said diode matrix means outputs to said counter means for preloading thereof.

4. Apparatus according to claim 3 further comprising:

said diode matrix means including a first plurality of busbars, a plurality of diodes each connected to a respective one of said first busbars and connected together to simultaneously receive said sample enable signal, and a second plurality of busbars grouped to indicate respective decimals, connector means for interconnecting predetermined ones of said first and second busbars and said pulse width modulator means further including decoder means connected to said second busbars for providing binary signals through said gating means to preload said counter means.

5. Apparatus according to claim 4 further comprising:

said slot control means including a plurality of serially cascaded binary counters;

said timing control means further including logic means connected to receive the output signals from each of the stages of said binary counters and said succession of sample enable signals from said sampling sequence generator and synchronizing means for successively providing sample and reset pulses;

said integrator means including resettable integrator amplifiers connected to receive the reset signals from said logic means; and sample control means connected to receive the output signal of said integrator means for providing an output signal equivalent to the input signal level at the time said sample pulse is received.

6. Apparatus comprising:

timing control means for providing sample enable signals of controlled durations during predetermined sampling intervals;

a least two integrator means for changing at constant rates the magnitudes of analog signals applied thereto respectively;

switch means including multiplexing means for successively applying divisor and dividend analog signals to said two integrator means respectively in response to successive sample enable signals from said timing control means;

first and second zero crossing detecting means operatively receiving the outputs of said two integrator means respectively each providing an output signal when the signal applied thereto has a predetermined polarity;

exclusive OR gate means connected to receive the output signals of said first and second zero crossing detecting means;

inverter means for providing the logical inversion of the input signals of said exclusive OR gate;

first and second flip-flop means connected to be set respectively by said OR gate output signal and said inverter means output signal;

accumulator module means connected to receive said divisor signal and said output signals from said first and second flip-flop means for adjusting the gain of said divisor signal relative to zero when said second flip-flop is in a set condition; and comparator means connected to receive said gain-adjusted divisor signal and said dividend signal for providing an output signal when said dividend signal and said gain-adjusted divisor signal have equal magnitudes for resetting said first and second flip-flop means, the outputs of said first and second flip-flop means thereby providing pulses having modulated widths indicative of the quotient of said divisor and dividend analog signals.

7. Apparatus comprising:

timing control means for providing successive sample enable signals of controlled durations during predetermined sampling intervals;

switch means including multiplexing means for successively applying first and second analog signals at respective outputs in response to successive sample enable signals from said timing control means;

accumulator module means having a differential integrator amplifier with inverting and noninverting inputs for integrating an input signal at a constant rate; and first polarity and second polarity switch means each connected to receive said first and second analog signals and connected to a respective one of said inverting and noninverting inputs of said integrator amplifier means for applying said analog input signals to a selected one of said integrator amplifier means in response to a corresponding sample enable signal.

8. Apparatus comprising:

timing control means including clock driven means providing an output signal indicative of the beginning of a sampling interval encompassing the duration of a sample enable signal, adaptive gain control means including a sawtooth generator responsive to said clock driven means output signal for providing a ramp function output signal, a voltage comparator connected to receive an input analog signal and said ramp function output signal for providing a comparator output signal when the voltage levels of said signals received are the same, and means responsive to said clock driven means output signal and said comparator output signal for providing said sample enable signal for a controlled duration during said sampling interval as a function of the level of said input analog signal;

at least one integrator means for changing at a constant rate the magnitude of an analog signal applied thereto; and switch means responsive to said sample enable signal for applying at least one analog signal to said integrator means for said controlled duration.

* * * * *